United States Patent [19]
Barren et al.

[11] Patent Number: 6,063,844
[45] Date of Patent: May 16, 2000

[54] POLYCARBONATE/RUBBER-MODIFIED GRAFT COPOLYMER RESIN BLENDS HAVING IMPROVED THERMAL STABILITY

[75] Inventors: James Barren, Scotia; Jianing Huang, Glemont, both of N.Y.

[73] Assignee: General Electric Company, Pittsfield, Mass.

[21] Appl. No.: 09/053,980

[22] Filed: Apr. 2, 1998

[51] Int. Cl.[7] .............................. C08K 5/15; C08K 5/49; C08K 5/09

[52] U.S. Cl. .......................... 524/117; 524/120; 524/145; 524/291

[58] Field of Search .................................. 524/117, 120, 524/145, 291

[56] References Cited

U.S. PATENT DOCUMENTS

| | | | |
|---|---|---|---|
| 3,169,121 | 2/1965 | Goldberg | 528/194 |
| 3,544,514 | 12/1970 | Schnell et al. | 528/204 |
| 3,635,895 | 1/1972 | Kramer | 525/462 |
| 3,671,487 | 6/1972 | Abolins | 524/141 |
| 3,723,373 | 3/1973 | Lucas | 525/165 |
| 4,001,184 | 1/1977 | Scott | 528/182 |
| 4,035,448 | 7/1977 | Mayerhoefer et al. | 524/117 |
| 4,430,484 | 2/1984 | Quinn | 525/425 |
| 4,487,896 | 12/1984 | Mark et al. | 525/439 |
| 4,525,514 | 6/1985 | Yachigo et al. | 524/291 |
| 4,579,906 | 4/1986 | Zabrocki et al. | 525/72 |
| 5,204,394 | 4/1993 | Gosens et al. | 524/125 |
| 5,389,714 | 2/1995 | Ohtomo et al. | 524/497 |
| 5,411,999 | 5/1995 | Gallucci | 523/436 |
| 5,521,230 | 5/1996 | Bhatia et al. | 523/328 |
| 5,623,009 | 4/1997 | Mahood | 524/117 |
| 5,672,645 | 9/1997 | Eckel et al. | 524/127 |

FOREIGN PATENT DOCUMENTS

| | | |
|---|---|---|
| 0 336 264 | 10/1989 | European Pat. Off. . |
| 0 426 499 | 5/1991 | European Pat. Off. . |
| 0 625 542 | 11/1994 | European Pat. Off. . |
| 0 682 081 | 11/1995 | European Pat. Off. . |
| 0 739 914 A1 | 10/1996 | European Pat. Off. . |

*Primary Examiner*—Kriellion Sanders

[57] ABSTRACT

A thermoplastic resin composition that contains a branched polycarbonate resin, a rubber modified graft copolymer that contains a discontinuous elastomeric phase dispersed in a continuous rigid thermoplastic phase, wherein at least a portion of the rigid thermoplastic phase is chemically grafted to the elastomeric phase, a sterically hindered phenol stabilizer compound, a thioester stabilizer compound and a phosphite stabilizer compound, exhibits improved stability.

15 Claims, No Drawings

POLYCARBONATE/RUBBER-MODIFIED GRAFT COPOLYMER RESIN BLENDS HAVING IMPROVED THERMAL STABILITY

FIELD OF THE INVENTION

The invention relates to thermoplastic resin compositions that are based on blends of a polycarbonate resin and a rubber modified graft copolymer and that exhibit improved thermal stability.

BRIEF DESCRIPTION OF THE RELATED ART

The use of various phenolic, phosphite and sulfur containing stabilizers, either singly or in combination, to stabilize thermoplastic resin compositions is generically known in the art, see, for example, U.S. Pat. No. 4,525,514.

Thermoplastic resin compositions that exhibit improved thermal stability are desired.

SUMMARY OF THE INVENTION

The thermoplastic resin composition of the present invention comprises:

(a) an aromatic polycarbonate resin (b) a rubber modified graft copolymer, comprising a discontinuous elastomeric phase dispersed in a continuous rigid thermoplastic phase, wherein at least a portion of the rigid thermoplastic phase is chemically grafted to the elastomeric phase, (c) a sterically hindered phenol stabilizer compound according to the structural formula:

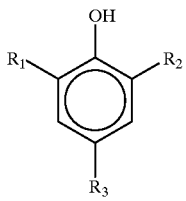

wherein $R_1$ and $R_2$ are each independently $(C_1-C_{12})$ alkyl, and $R_3$ is $(C_1-C_{12})$alkyl, hydroxy$(C_1-C_{12})$alkyl or $(C_1-C_{24})$alkoxycarbonyl$(C_{1-12})$alkyl;

(d) a thioester stabilizer compound according to the structural formula:

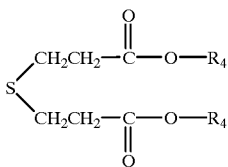

wherein $R_4$ is $(C_1-C_{24})$alkyl, or according to the structural formula:

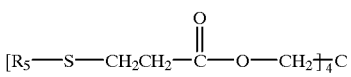

wherein $R_5$ is $(C_1-C_{24})$alkyl, and (e) a phosphite stabilizer compound according to the structural formula:

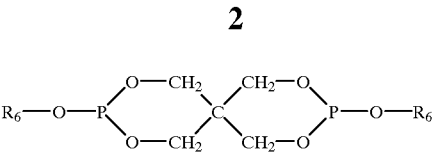

wherein $R_6$ is $(C_1-C_{24})$alkyl or monocyclic aryl, optionally substituted with up to three $(C_1-C_{12})$alkyl groups, or according to the structural formula:

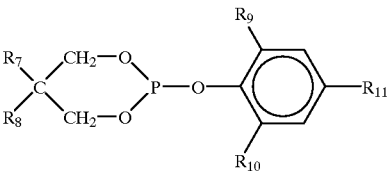

wherein $R_7$, $R_8$, $R_9$ $R_{10}$ and $R_{11}$ are each independently $(C_1-C_{12})$alkyl.

The composition of the present invention exhibits unexpectedly improved stability.

DETAILED DESCRIPTION OF THE INVENTION

In a first preferred embodiment, the thermoplastic resin composition of the present invention comprises from 15 to 85 parts by weight ("pbw"), more preferably from 50 to 80 pbw, even more preferably from 60 to 75 pbw, of the aromatic polycarbonate resin, from 15 to 85 pbw, more preferably from 20 to 50 pbw, even more preferably from 25 to 40 pbw, of the rubber modified graft copolymer, from 0.01 to 1.0 pbw, more preferably from 0.05 to 0.5 pbw, even more preferably from 0.1 to 0.4 pbw, of the sterically hindered phenol stabilizer compound, and from 0.01 to 1.0 pbw, more preferably from 0.05 to 0.5 pbw, even more preferably from 0.1 to 0.4, of the thioester stabilizer compound and from 0.01 to 1.0 pbw, more preferably from 0.05 to 0.5 pbw, even more preferably from 0.1 to 0.4 phosphite stabilizer compound, each based on 100 pbw of the combined amount of the aromatic polycarbonate resin and rubber modified graft copolymer.

In a second preferred embodiment, the thermoplastic resin composition of the present invention comprises an aromatic polycarbonate resin, a rubber modified graft copolymer, a hindered phenol stabilizer a thioester stabilizer and a phosphite stabilizer as disclosed above, and further comprises a phosphate flame retardant. In a more highly preferred embodiment, the composition comprises from 55 to 90 pbw, more preferably from 60 to 85 pbw, even more preferably from 68 to 82 pbw, of the aromatic polycarbonate resin, from 3 to 11 pbw, more preferably from 4 to 10 pbw, even more preferably from 4.5 to 9.5 pbw, of the rubber modified graft copolymer, from 2 to 20 pbw, more preferably from 5 to 15 pbw, even more preferably from 7 to 12 pbw, of the phosphate flame retardant, from 0.01 to 1.0 pbw, more preferably from 0.05 to 0.5 pbw, even more preferably from greater than 0.15 to 0.4 pbw, of the sterically hindered phenol stabilizer compound, and from 0.01 to 1.0 pbw, more preferably from 0.05 to 0.5 pbw, even more preferably from greater than 0.15 to 0.4 pbw, of the thioester stabilizer compound and from 0.01 to 1.0 pbw, more preferably from 0.05 to 0.5 pbw, even more preferably from greater than 0.15 to 0.4 pbw phosphite stabilizer compound, each based on 100 pbw of the combined amount of the aromatic polycarbonate resin, rubber modified graft copolymer and phosphate flame retardant.

Aromatic Polycarbonate Resin

Aromatic polycarbonate resins suitable for use as the aromatic polycarbonate resin component of the thermoplastic resin composition of the present invention are known compounds whose preparation and properties have been described, see, generally, U.S. Pat. Nos. 3,169,121, 4,487, 896 and 5,411,999, the respective disclosures of which are each incorporated herein by reference.

In a preferred embodiment, the aromatic polycarbonate resin component of the present invention is the reaction product of a dihydric phenol according to the structural formula (I):

wherein A is a divalent aromatic radical, with a carbonate precursor and contains structural units according to the formula (II):

wherein A is defined as above.

As used herein, the term "divalent aromatic radical" includes those divalent radicals containing a single aromatic ring such as phenylene, those divalent radicals containing a condensed aromatic ring system such as, for example, naphthlene, those divalent radicals containing two or more aromatic rings joined by non-aromatic linkages, such as for example, an alkylene, alkylidene or sulfonyl group, any of which may be substituted at one or more sites on the aromatic ring with, for example, a halo group or $(C_1-C_6)$ alkyl group. As used herein to modify an organic substituent group, the notation "$(C_x-C_y)$", wherein x and y are each integers, means that the organic substituent group contains from x carbon atoms to y carbon atoms per group.

In a preferred embodiment, A is a divalent aromatic radical according to the formula (III):

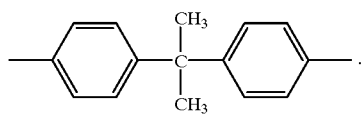

Suitable dihydric phenols include, for example, one or more of 2,2-bis-(4-hydroxyphenyl) propane ("bisphenol A"), 2,2-bis(3,5-dimethyl-4-hydroxyphenyl)propane, bis(4-hydroxyphenyl) methane, 4,4-bis(4-hydroxyphenyl) heptane, 3,5,3', 5'-tetrachloro4,4'-dihydroxyphenyl)propane, 2,6-dihydroxy naphthalene, hydroquinone, 2,4'-dihydroxyphenyl sulfone. In a highly preferred embodiment, the dihydric phenol is bisphenol A.

The carbonate precursor is one or more of a carbonyl halide, a carbonate ester or a haloformate. Suitable carbonyl halides include, for example, carbonyl bromide and carbonyl chloride. Suitable carbonate esters include, such as for example, diphenyl carbonate, dichlorophenyl carbonate, dinaphthyl carbonate, phenyl tolyl carbonate and ditolyl carbonate. Suitable haloformates include, for example, bishaloformates of a dihydric phenols, such as, for example, hydroquinone, or glycols, such as, for example, ethylene glycol, neopentyl glycol. In a highly preferred embodiment, the carbonate precursor is carbonyl chloride.

Suitable aromatic polycarbonate resins include linear aromatic polycarbonate resins, branched aromatic polycarbonate resins. Suitable linear aromatic polycarbonates resins include, e.g., bisphenol A polycarbonate resin. Suitable branched polycarbonates are known and are made by reacting a polyfunctional aromatic compound with a dihydric phenol and a carbonate precursor to form a branched polymer, see generally, U.S. Pat. Nos. 3,544,514, 3,635,895 and 4,001,184, the respective disclosures of which are incorporated herein by reference. The polyfunctional compounds are generally aromatic and contain at least three functional groups which are carboxyl, carboxylic anhydrides, phenols, haloformates or mixtures thereof, such as, for example, 1,1,1-tri(4-hydroxyphenyl)ethane, 1,3,5,-trihydroxy-benzene, trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic dianhydride. The preferred polyfunctional aromatic compounds are 1,1, 1-tri(4-hydroxyphenyl)ethane, trimellitic anhydride or trimellitic acid or their haloformate derivatives.

In a preferred embodiment, the polycarbonate resin component of the present invention is a linear polycarbonate resin derived from bisphenol A and phosgene.

In a preferred embodiment, the weight average molecular weight of the polycarbonate resin is from about 10,000 to more than 200,000 g/mol, as determined by gel permeation chromatography relative to polystyrene. Such resin typically exhibits an intrinsic viscosity of about 0.3 to about 1.5 deciliters per gram in methylene chloride at 25° C.

Polycarbonate resins are made by known methods, such as, for example, interfacial polymerization, transesterification, solution polymerization or melt polymerization.

Copolyester-carbonate resins suitable for use as component (c) of the thermoplastic resin composition of the present invention are known compounds whose preparation and properties have been described, see, generally, U.S. Pat. Nos. 3,169,121, 4,430,484 and 4,487,896, the respective disclosures of which are each incorporated herein by reference.

Copolyester-carbonate resins comprise linear or randomly branched polymers that contain recurring carbonate groups, carboxylate groups and aromatic carbocyclic groups in the polymer chain, in which at least some of the carbonate groups are bonded directly to the ring carbon atoms of the aromatic carbocyclic groups.

In a preferred embodiment, the copolyester-carbonate resin component of the present invention is derived from a carbonate precursor, at least one dihydric phenol and at least one dicarboxylic acid or dicarboxylic acid equivalent. In a preferred embodiment, the dicarboxylic acid is one according to the formula (IV):

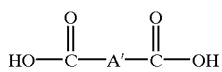

wherein A' is alkylene, alkylidene, cycloaliphatic or aromatic and is preferably a non-substituted phenylene radical or a substituted phenylene radical that is substituted at one or more sites on the aromatic ring, wherein each of such substituent groups is independently $(C_1-C_6)$ alkyl, and the copolyester carbonate resin comprises first structural units according to formula (II) above and second structural units according to formula (V):

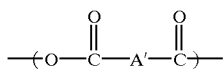

(V)

wherein A' is defined as above.

Suitable carbonate precursors and dihydric phenols are those disclosed above.

Suitable dicarboxylic acids, include, for example, phthalic acid, isophthalic acid, terephthalic acid, dimethyl terephthalic acid, oxalic acid, malonic acid, succinic acid, glutaric acid, adipic acid, pimelic acid, suberic acid, azelaic acid, sebacic acid, dimethyl malonic acid, 1,12-dodecanoic acid, cis-1,4-cyclohexane dicarboxylic acid, trans-1,4-cyclohexane dicarboxylic acid, 4,4'-bisbenzoic acid, naphthalene-2,6-dicarboxylic acid. Suitable dicarboxylic acid equivalents include, for example, anhydride, ester or halide derivatives of the above disclosed dicarboxylic acids, such as, for example, phthalic anhydride, dimethyl terephthalate, succinyl chloride.

In a preferred embodiment, the dicarboxylic acid is an aromatic dicarboxylic acid, more preferably one or more of terephthalic acid and isophthalic acid.

In a preferred embodiment, the ratio of ester bonds to carbonate bonds present in the copolyester carbonate resin is from 0.25 to 0.9 ester bonds per carbonate bond.

In a preferred embodiment, the copolyester-carbonate copolymer has a weight average molecular weight of from about 10,000 to about 200,000 g/mol.

Copolyester-carbonate resins are made by known methods, such as, for example, interfacial polymerization, transesterification, solution polymerization or melt polymerization.

Rubber Modified Thermoplastic Resin

Rubber modified thermoplastic resins suitable as the rubber modified thermoplastic resin of the present invention comprise a discontinuous elastomeric phase dispersed in a continuous rigid thermoplastic phase, wherein at least a portion of the rigid thermoplastic phase is chemically grafted to the elastomeric phase and are known compounds whose preparation and properties have been described.

(a) Elastomeric Phase

Suitable materials for use as the elastomeric phase are polymers those having a glass transition temperature ($T_g$) of less than or equal to 25° C., more preferably less than or equal to 0° C., and even more preferably less than or equal to −30° C. As referred to herein, the $T_g$ of a polymer is the $T_g$ value of polymer as measured by differential scanning calorimetry (heating rate 20° C./minute, with the $T_g$ value being determined at the inflection point).

In a preferred embodiment, the elastomer phase comprises a polymer having structural units derived from one or more monoethylenically unsaturated monomers selected from conjugated diene monomers, non-conjugated diene monomers or ($C_1$–$C_{12}$)alkyl(meth)acrylate monomers Suitable conjugated diene monomers include, e.g., 1,3-butadiene, isoprene, 1,3-heptadiene, methyl-1,3-pentadiene, 2,3-dimethylbutadiene, 2-ethyl-1,3-pentadiene, 1,3-hexadiene, 2,4, hexadiene, dichlorobutadiene, bromobutadiene and dibromobutadiene as well as mixtures of conjugated diene monomers. In a preferred embodiment, the conjugated diene monomer is 1,3-butadiene.

Suitable non-conjugated diene monomers include, e.g., ethylidene norbornene, dicyclopentadiene, hexadiene or phenyl norbornene.

As used herein, the term "($C_1$–$C_{12}$)alkyl" means a straight or branched alkyl substituent group having from 1 to 12 carbon atoms per group and includes, e.g., methyl, ethyl, n-butyl, sec-butyl, t-butyl, n-propyl, iso-propyl, pentyl, hexyl, heptyl, octyl, nonyl, decyl, undecyl and dodecyl, and the terminology "(meth)acrylate monomers" refers collectively to acrylate monomers and methacrylate monomers. Suitable ($C_1$–$C_{12}$)alkyl (meth)acrylate monomers include ($C_1$–$C_{12}$)alkyl acrylate monomers, e.g., ethyl acrylate, butyl acrylate, isopentyl acrylate, n-hexyl acrylate, 2-ethyl hexyl acrylate, and their ($C_1$–$C_{12}$)alkyl methacrylate analogs such as, e.g., methyl methacrylate, ethyl methacrylate, propyl methacrylate, iso-propyl methacrylate, butyl methacrylate, hexyl methacrylate, decyl methacrylate.

The elastomeric phase may, optionally, include up to about 40 percent by weight ("wt %") of one or more monomers selected from ($C_2$–$C_8$)olefin monomers, vinyl aromatic monomers and monoethylenically unsaturated nitrile monomers.

As used herein, the term "($C_2$–$C_8$)olefin monomers" means a compound having from 2 to 8 carbon atoms per molecule and having a single site of ethylenic unsaturation per molecule. Suitable ($C_2$–$C_8$)olefin monomers include, e.g., ethylene, propene, 1-butene, 1-pentene, heptene.

Suitable vinyl aromatic monomers include, e.g., styrene and substituted styrenes having one or more alkyl, alkoxyl, hydroxyl or halo substituent group attached to the aromatic ring, including, e.g., α-methyl styrene, p-methyl styrene, vinyl toluene, vinyl xylene, trimethyl styrene, butyl styrene, chlorostyrene, dichlorostyrene, bromostyrene, p-hydroxystyrene, methoxystyrene and vinyl-substituted condensed aromatic ring structures, such as, e.g., vinyl naphthalene, vinyl anthracene, as well as mixtures of vinyl aromatic monomers.

As used herein, the term "monoethylenically unsaturated nitrile monomer" means an acyclic compound that includes a single nitrile group and a single site of ethylenic unsaturation per molecule and includes, e.g., acrylonitrile, methacrylonitrile, α-chloro acrylonitrile.

The elastomeric phase may, optionally, include a minor amount, e.g., up to 5 wt %, of structural units derived from a polyethylenically unsaturated "crosslinking" monomer, e.g., butylene diacrylate, divinyl benzene, butene diol dimethacrylate, trimethylolpropane tri(meth)acrylate. As used herein, the term "polyethylenically unsaturated" means having two or more sites of ethylenic unsaturation per molecule.

The elastomeric phase may, particularly in those embodiments wherein the elastomeric phase has structural units derived from alkyl (meth)acrylate monomers, include a minor amount, e.g., up to 5 wt % of structural units derived from a polyethylenically unsaturated "graftlinking" monomer. Suitable graftlinking monomers include those monomers having a first site of ethylenic unsaturation with a reactivity similar to that of the monoethylenically unsaturated monomers from which the respective substrate or superstrate is derived and a second site of ethylenic unsaturation with a relative reactivity that is substantially different from that of the monoethylenically unsaturated monomers from which the elastomeric phase is derived so that the first site reacts during synthesis of the elastomeric phase and the second site is available for later reaction under different reaction conditions, e.g., during synthesis of the rigid thermoplastic phase. Suitable graftlinking monomers include, e.g., allyl methacrylate, diallyl maleate, triallyl cyanurate.

In a preferred embodiment, the elastomeric phase comprises from 60 to 100 wt % structural units derived from one or more conjugated diene monomers and from 0 to 40 wt % structural units derived from one or more monomers selected from vinyl aromatic monomers and monoethylenically unsaturated nitrile monomers, such as, for example, a styrene-butadiene copolymer, an acrylonitrile-butadiene copolymer or a styrene-butadiene-acrylonitrile copolymer.

In an alternative preferred embodiment, the elastomeric phase comprises structural units derived from one or more ($C_1$–$C_{12}$)alkyl acrylate monomers. In a more highly preferred embodiment, the rubbery polymeric substrate comprises from 40 to 95 wt % structural units derived from one or more ($C_1$–$C_{12}$)alkyl acrylate monomers, more preferably from one or more monomers selected from ethyl acrylate, butyl acrylate and n-hexyl acrylate.

In a preferred embodiment, the elastomeric phase is made by aqueous emulsion polymerization in the presence of a free radical initiator, e.g., an azonitrile initiator, an organic peroxide initiator, a persulfate initiator or a redox initiator system, and, optionally, in the presence of a chain transfer agent, e.g., an alkyl mercaptan and coagulated to form particles of elastomeric phase material. In a preferred embodiment, the emulsion polymerized particles of elastomeric phase material have a weight average particle size of 50 to 800 nm, more preferably, of from 100 to 500 nm, as measured by light transmission. The size of emulsion polymerized elastomeric particles may optionally be increased by mechanical or chemical agglomeration of the emulsion polymerized particles, according to known techniques.

(b) Rigid Thermoplastic Phase

The rigid thermoplastic resin phase comprises one or more thermoplastic polymers and exhibits a $T_g$ of greater than 25° C., preferably greater than or equal to 90° C. and even more preferably greater than or equal to 100° C.

In a preferred embodiment, the rigid thermoplastic phase comprises a polymer or a mixture of two or more polymers each having structural units derived from one or more monomers selected from the group consisting of ($C_1$–$C_{12}$) alkyl (meth)acrylate monomers, vinyl aromatic monomers and monoethylenically unsaturated nitrile monomers. Suitable ($C_1$–$C_{12}$)alkyl (meth)acrylate monomers, vinyl aromatic monomers and monoethylenically unsaturated nitrile monomers are those set forth above in the description of the elastomeric phase.

In a highly preferred embodiment, rigid thermoplastic phase comprises one or more vinyl aromatic polymers. Suitable vinyl aromatic polymers comprise at least 50 wt % structural units derived from one or more vinyl aromatic monomers.

In a preferred embodiment, the rigid thermoplastic resin phase comprises a vinyl aromatic polymer having first structural units derived from one or more vinyl aromatic monomers and having second structural units derived from one or more monoethylenically unsaturated nitrile monomers.

The rigid thermoplastic phase is made according to known processes, e.g., mass polymerization, emulsion polymerization, suspension polymerization or combinations thereof, wherein a at least a portion of the rigid thermoplastic phase is chemically bonded, i.e., "grafted" to the elastomeric phase via reaction with unsaturated sites present in the elastomeric phase. The unsaturated sites in the elastomeric phase are provided, e.g., by residual unsaturated sites in structural units derived from a conjugated diene or by residual unsaturated sites in structural units derived from a graftlinking monomer.

In a preferred embodiment, at least a portion of the rigid thermoplastic phase is made by an aqueous emulsion or aqueous suspension polymerization reaction in the presence of elastomeric phase and a polymerization initiator system, e.g., a thermal or redox initiator system.

In an alternative preferred embodiment, at least a portion of the thermoplastic phase is made by a mass polymerization process, wherein particles of the material from which the elastomeric phase is to be formed are dissolved in a solvent and added to a mixture of the monomers from which the rigid thermoplastic phase is to be formed and the monomers of the mixture are then polymerized to form the rubber modified thermoplastic resin.

The amount of grafting that takes place between the rigid thermoplastic phase and the elastomeric phase varies with the relative amount and composition of the elastomeric phase. In a preferred embodiment, from 10 to 90 wt %, preferably from 25 to 60 wt %, of the rigid thermoplastic phase is chemically grafted to the elastomeric phase and from 10 to 90 wt %, preferably from 40 to 75 wt % of the rigid thermoplastic phase remains "free, i.e., non-grafted.

The rigid thermoplastic phase of the rubber modified thermoplastic resin may be formed: (i) solely by polymerization carried out in the presence of the elastomeric phase or (ii) by addition of one or more separately polymerized rigid thermoplastic polymers to a rigid thermoplastic polymer that has been polymerized in the presence of the elastomeric phase.

In a preferred embodiment, the rubber modified thermoplastic resin comprises an elastomeric phase comprising a polymer having structural units derived from one or more conjugated diene monomers, and, optionally, further comprising structural units derived from one or more monomers selected from vinyl aromatic monomers and monoethylenically unsaturated nitrile monomers, and the rigid thermoplastic phase comprises a polymer having structural units derived from one or more monomers selected from vinyl aromatic monomers and monoethylenically unsaturated nitrile monomers.

Each of the polymers of the elastomeric phase and of the rigid thermoplastic resin phase of the rubber modified thermoplastic resin may, provided that the $T_g$ limitation for the respective phase is satisfied, optionally include up to 10 wt % of third structural units derived from one or more other copolymerizable monomers such as, e.g., monoethylenically unsaturated carboxylic acids such as, e.g., acrylic acid, methacrylic acid, itaconic acid, hydroxy($C_1$–$C_{12}$)alkyl (meth)acrylate monomers such as, e.g., hydroxyethyl methacrylate; ($C_4$–$C_{12}$)cycloalkyl (meth)acrylate monomers such as e.g., cyclohexyl methacrylate; (meth)acrylamide monomers such as e.g., acrylamide and methacrylamide; maleimide monomers such as, e.g., N-alkyl maleimides, N-aryl maleimides, maleic anhydride, vinyl esters such as, e.g., vinyl acetate and vinyl propionate. As used herein, the term "($C_4$–$C_{12}$)cycloalkyl" means a cyclic alkyl substituent group having from 4 to 12 carbon atoms per group and the term "(meth)acrylamide" refers collectively to acrylamides and methacrylamides.

Sterically Hindered Phenol Stabilizer

Sterically hindered phenolic stabilizer compounds suitable for use as the sterically hindered phenolic stabilizer compound of the present invention are known compounds, are made by known methods and are commercially available.

In a preferred embodiment, the phenolic stabilizer component of the composition is a monophenol stabilizer according to the structural formula(VI):

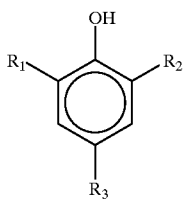

(VI)

wherein:
R$_1$ and R$_2$ are each independently (C$_1$–C$_{12}$)alkyl, and R$_3$ is (C$_1$–C$_{12}$)alkyl, hydroxy(C$_1$–C$_{12}$)alkyl or (C$_{1-C24}$)alkoxycarbonyl(C$_{1-12}$)alkyl.

In a preferred embodiment, R$_1$ and R$_2$ are each (C$_2$–C$_8$) alkyl. In a more highly preferred embodiment, R$_1$ and R$_2$ are each t-butyl. In a preferred embodiment, R$_3$ is hydroxy (C$_1$–C$_6$)alkyl or (C$_1$–C$_6$)alkoxycarbonyl(C$_{1-12}$)alkyl. In a more highly preferred embodiment, R$_3$ is octadecyloxycarbonylethyl. Suitable compounds according to formula (VI) include, for example, 2,6-di-t-butyl-p-cresol, 4-(hydroxymethyl)-2,6-di-t-butylphenol, 2,6-di-t-butyl-4-sec-butylphenol.

In a highly preferred embodiment, the phenolic stabilizer component of the composition of the present invention comprises octadecyl-3-(3,5-di-tert-butyl-4-hydroxyphenyl) propionate.

Thioester Stabilizer Compound

Thioester stabilizer compounds suitable for use as the thioester stabilizer compound of the present invention are known compounds, are made by known methods and are commercially available.

In a preferred embodiment, the thioester stabilizer component of the composition of the present invention is a compound according to the structural formula (VII) or (VIII):

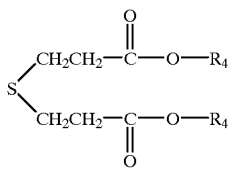

(VII)

wherein R$_4$ is (C$_1$–C$_{24}$)alkyl, or

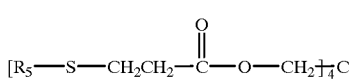

(VIII)

wherein R$_5$ is (C$_1$–C$_{24}$)alkyl.

In a preferred embodiment, R$_4$ is (C$_8$–C$_{16}$)alkyl. Suitable compounds according to formula (VII) include, for example, dilauryl thiodipropionate, dimyristyl thiodipropionate and distearyl thiodipropionate.

In a preferred embodiment, R$_5$ is (C$_8$–C$_{16}$)alkyl. Suitable compounds according to formula (VIII) include, for example, pentaerythritol tetrakis(3-(dodecylthio)propionate).

In a highly preferred embodiment, the thioester stabilizer component of the composition of the present invention is pentaerythritol tetrakis(3-(dodecylthio)propionate).

Phosphite Stabilizer Compound

Phosphite stabilizer compounds suitable for use as the phosphite stabilizer compound of the present invention are known compounds, are made by known methods and are commercially available.

In a preferred embodiment, the phosphite stabilizer component of the composition of the present invention is a compound according to the structural formula (IX):

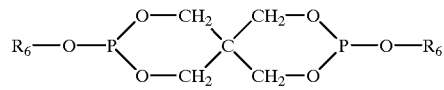

(IX)

wherein R$_6$ is(C$_1$–C$_{24}$)alkyl or monocyclic aryl, optionally substituted with up to three (C$_1$–C$_{12}$)akyl groups; or according to the structural formula (X):

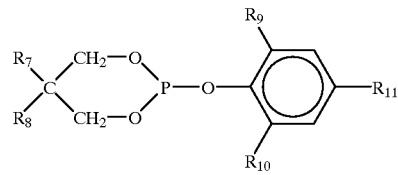

(X)

wherein R$_7$, R$_8$, R$_9$, R$_{10}$ and R$_{11}$ are each independently (C$_1$–C$_{12}$)alkyl.

In a preferred embodiment, R$_6$ is (C$_8$–C$_{24}$)alkyl or phenyl substituted with two independently selected (C$_1$–C$_6$)alkyl groups. In a more preferred embodiment, R$_6$ is 2,4-di-t-butylphenyl. Suitable compounds according to formula (IX) include, for example, distearyl pentaerithritol diphosphite and bis(2,4-di-tert butyl)pentaerythritol diphosphite.

In a preferred embodiment, R$_7$, R$_8$, R$_9$, R$_{10}$ and R$_{11}$ are each independently (C$_1$–C$_6$)alkyl. In a more highly preferred embodiment, R$_7$ is n-butyl, R$_8$ is ethyl, and R$_9$, R$_{10}$ and R$_{11}$ are each t-butyl.

In a highly preferred embodiment, the phosphite stabilizer comprises bis(2,4-di-tert butyl)pentaerythritol diphosphite.

Organophosphorus Flame Retardant

Organophosphorus compounds suitable as the organophosphorus flame retardant of the present invention are known compounds including monophosphate esters such as, for example, triphenyl phosphate, tricresyl phosphate, tritolyl phosphate, diphenyl tricresylphosphate, phenyl bis-dodecyl phosphate, ethyl diphenyl phosphate, as well as diphosphate esters and oligomeric phosphates such as, for example, resorcinol diphosphate, diphenyl hydrogen phosphate, 2-ethylhexyl hydrogen phosphate. Suitable oligomeric phosphate compounds are set forth in coassigned U.S. Pat. No. 5,672,645, to Johannes C. Gossens et al for a "Polymer Mixture Having Aromatic Polycarbonate, Styrene Containing Copolymer and/or Graft Copolymer and a Flame Retardant, Articles Formed Therefrom", the disclosure of which is hereby incorporated herein by reference.

In a preferred embodiment, the organophosphorus flame retardant of the present invention comprises one or more compounds according to the structural formula (XI):

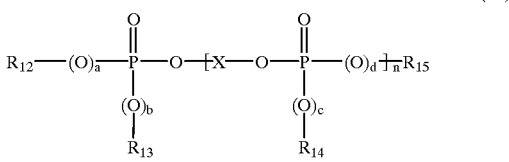

(XI)

wherein $R_{12}$, $R_{13}$, $R_{14}$ and $R_{15}$ are each independently aryl, which may optionally be substituted with halo or alkyl, X is arylene, optionally substituted with halo or alkyl, a, b, c and d are each independently 0 or 1, and n is an integer of from 0 to 5, more preferably from 1 to 5.

As used herein, aryl means a monovalent radical containing one or more aromatic rings per radical, which, in the case wherein the radical contains two or more rings, may be fused rings and which may optionally be substituted on the one or more aromatic rings with one or more alkyl groups, each preferably $(C_{1-C_6})$alkyl.

As used herein, arylene means a divalent radical containing one or more aromatic rings per radical, which may optionally be substituted on the one or more aromatic rings with one or more alkyl groups, each preferably $(C_1-C_6)$alkyl and which, in the case wherein the divalent radical contains two or more rings, the rings may be may be fused or may be joined by a non-aromatic linkages, such as for example, an alkylene, alkylidene, any of which may be substituted at one or more sites on the aromatic ring with a halo group or $(C_1-C_6)$alkyl group.

In a highly preferred embodiment, $R_{12}$, $R_{13}$, $R_{14}$ and $R_{15}$ are each phenyl, a, b, c and d are each 1 and X is phenylene, more preferably 1,3-phenylene.

In an alternative highly preferred embodiment, $R_{12}$, $R_{13}$, $R_{14}$ and $R_{15}$ are each phenyl, a, b, c and d are each 1 and X is a divalent radical according to the structural formula (XII):

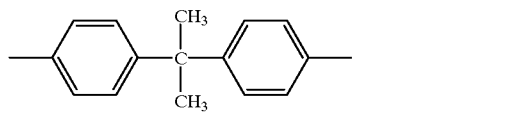

(XII)

In preferred embodiment, the organophosphorus flame retardant comprises a blend of organophosphorus oligomers, each according to formula (VI), wherein n is, independently for each oligomer, an integer from 1 to 5 and wherein the blend of oligomers has an average n of from greater than 1 to less than 5, more preferably greater than 1 to less than 3, even more preferably greater than 1 to less than 2, still more preferably from 1.2 to 1.7.

Fluoropolymer Additive

In a preferred embodiment, the composition of the present invention includes a fluoropolymer, in an amount, typically from 0.01 to 0.5 pbw fluoropolymer per 100 pbw of the thermoplastic resin composition, that is effective to provide anti-drip properties to the resin composition. Suitable fluoropolymers and methods for making such fluoropolymers are known, see, e.g., U.S. Pat. Nos. 3,671,487, 3,723,373 and 3,383,092. Suitable fluoropolymers include homopolymers and copolymers that comprise structural units derived from one or more fluorinated α-olefin monomers. The term "fluorinated α-olefin monomer" means an α-olefin monomer that includes at least one fluorine atom substituent. Suitable fluorinated α-olefin monomers include, e.g., fluoroethylenes such as, e.g., $CF_2=CF_2$, $CHF=CF_2$, $CH_2=CF_2$, $CH_2=CHF$, $CClF=CF_2$, $CCl_2=CF_2$, $CClF=CClF$, $CHF=CCl_2$, $CH_2=CClF$, and $CCl_2=CClF$ and fluoropropylenes such as, e.g., $CF_3CF=CF_2$, $CF_3CF=CHF$, $CF_3CH=CF_2$, $CF_3CH=CH_2$, $CF_3CF=CHF$, $CHF_2CH=CHF$ and $CF_3CH=CH_2$. In a preferred embodiment, the fluorinated α-olefin monomer is one or more of tetrafluoroethylene ($CF_2=CF_2$), chlorotrichloroethylene ($CClF=CF_2$), vinylidene fluoride ($CH_2=CF_2$) and hexafluoropropylene ($CF_2=CFCF_3$).

Suitable fluorinated α-olefin homopolymers include e.g., poly(tetrafluoroethylene), poly(hexafluoroethylene).

Suitable fluorinated α-olefin copolymers include copolymers comprising structural units derived from two or more fluorinated α-olefin copolymers such as, e.g., poly (tetrafluoroethylene-hexafluoroethylene), and copolymers comprising structural units derived from one or more fluorinated monomers and one or more non-fluorinated monoethylenically unsaturated monomers that are copolymerizable with the fluorinated monomers such as, e.g., poly (tetrafluoroethylene-ethylene-propylene) copolymers. Suitable non-fluorinated monoethylenically unsaturated monomers include e.g., α-olefin monomers such as, e.g., ethylene, propylene butene, acrylate monomers such as e.g., methyl methacrylate, butyl acrylate, vinyl ethers, such as, e.g., cyclohexyl vinyl ether, ethyl vinyl ether, n-butyl vinyl ether, vinyl esters such as, e.g., vinyl acetate, vinyl versatate.

In a preferred embodiment, the fluoropolymer particles range in size from 50 to 500 nm, as measured by electron microscopy.

In a highly preferred embodiment, the fluoropolymer is a poly(tetrafluoroethylene) homopolymer ("PTFE").

Since direct incorporation of a fluoropolymer into a thermoplastic resin composition tends to be difficult, it is preferred that the fluoropolymer be pre-blended in some manner with a second polymer, such as for, example, an aromatic polycarbonate resin or a styrene-acrylonitrile resin. For example, an aqueous dispersion of fluoropolymer and a polycarbonate resin may be steam precipitated to form a fluoropolymer concentrate for use as a drip inhibitor additive in thermoplastic resin composition, as disclosed in ,for example, U.S. Pat. No. 5,521,230, or, alternatively, an aqueous styrene-acrylonitrile resin emulsion or an aqueous acrylonitrile-butadiene-styrene resin emulsion and then precipitating and drying the co-coagulated fluoropolymer-thermoplastic resin composition to provide a PTFE-thermoplastic resin powder as disclosed in, for example, U.S. Pat. No. 4,579,906.

In a preferred embodiment, the fluoropolymer additive comprises from 30 to 70 wt %, more preferably 40 to 60 wt %, of the fluoropolymer and from 30 to 70 wt %, more preferably 40 to 60 wt %, of the second polymer.

In a preferred embodiment, a fluoropolymer additive is made by emulsion polymerization of one or more monoethylenically unsaturated monomers in the presence of the aqueous fluoropolymer dispersion of the present invention to form a second polymer in the presence of the fluoropolymer. Suitable monoethylenically unsaturated monomers are disclosed above. The emulsion is then precipitated, e.g., by addition of sulfuric acid. The precipitate is dewatered, e.g., by centrifugation, and then dried to form a fluoropolymer additive that comprises fluoropolymer and an associated second polymer. The dry emulsion polymerized fluoropolymer additive is in the form of a free-flowing powder.

In a preferred embodiment, the monoethylenically unsaturated monomers that are emulsion polymerized to form the second polymer comprise one or more monomers selected from vinyl aromatic monomers, monoethylenically unsaturated nitrile monomer and $(C_1-C_{12})$alkyl (meth)acrylate monomers. Suitable vinyl aromatic monomers, monoethylenically unsaturated nitrile monomer and $(C_1-C_{12})$alkyl (meth)acrylate monomers are disclosed above.

In a highly preferred embodiment, the second polymer comprises structural units derived from styrene and acrylonitrile. More preferably, the second polymer comprises from 60 to 90 wt % structural units derived from styrene and from 10 to 40 wt % structural units derived from acrylonitrile.

The emulsion polymerization reaction mixture may optionally include emulsified or dispersed particles of a third polymer, such as, e.g., an emulsified butadiene rubber latex.

The emulsion polymerization reaction is initiated using a conventional free radical initiator such as, e.g., an organic peroxide compound, such as e.g., benzoyl peroxide, a persulfate compound, such as, e.g., potassium persulfate, an azonitrile compound such as, e.g., 2,2'-azobis-2,3,3-trimethylbutyronitrile, or a redox initiator system, such as, e.g., a combination of cumene hydroperoxide, ferrous sulfate, tetrasodium pyrophosphate and a reducing sugar or sodium formaldehyde sulfoxylate.

A chain transfer agent such as, e.g., a $(C_9-C_{13})$ alkyl mercaptan compound such as nonyl mercaptan, t-dodecyl mercaptan, may, optionally, be added to the reaction vessel during the polymerization reaction to reduce the molecular weight of the second polymer. In a preferred embodiment, no chain transfer agent is used.

In a preferred embodiment, the stabilized fluoropolymer dispersion is charged to a reaction vessel and heated with stirring. The initiator system and the one or more monoethylenically unsaturated monomers are then charged to the reaction vessel and heated to polymerize the monomers in the presence of the fluoropolymer particles of the dispersion to thereby form the second polymer.

Suitable fluoropolymer additives and emulsion polymerization methods are disclosed in EP 0 739 914 A1.

In a preferred embodiment, the second polymer exhibits a weight average molecular weight of from about 10,000 to about 200,000 g/mol.

Other Additives

The thermoplastic resin composition of the present invention may optionally also contain various conventional additives, such as UV absorbers and light stabilizers, fillers and reinforcing agents, lubricants, plasticizers, optical brighteners, pigments, dyes, colorants, flameproofing agents; anti-static agents; blowing agents and flame retardant additives, as well as other antioxidants, stabilizers and flame retardant compounds in addition to those disclosed above.

In a preferred embodiment, the composition contains a surface-modified $TiO_2$ that is coated with one or more layers of one or more organopolysiloxane polymers selected from linear organosiloxane polymers, branched organosiloxane polymers and mixtures thereof. In a highly preferred embodiment, the coating contains an organopolysiloxane polymer having Si-H bonds, such as, for example, a dimethyl polysiloxane in which all or part of the dimethyl polysiloxane units are replaced with methyl hydrogen siloxane units. Suitable surface-modified $TiO_2$ and suitable organopolysiloxane polymers are disclosed, for example, in U.S. Pat. No. 5,389,714, the disclosure of which is incorporated herein by reference.

The thermoplastic resin composition of the present invention is made by combining and mixing the components of the composition of the present invention under conditions suitable for the formation of a blend of the components, such as for example, by melt mixing using, for example, a two-roll mill, a Banbury mixer or a single screw or twin-screw extruder, and, optionally, then reducing the composition so formed to particulate form, e.g., by pelletizing or grinding the composition.

The thermoplastic resin composition of the present invention can be molded into useful shaped articles by a variety of means such as injection molding, extrusion, rotational molding, blow molding and thermoforming to form articles such as, for example, computer and business machine housings, home appliances.

EXAMPLES 1–4 AND COMPARATIVE EXAMPLES C1–C5

The respective thermoplastic resin compositions of Comparative Examples C1–C5 and Examples 1–4 of the present invention were each made by combining the components described below in the relative amounts (each expressed in parts by weight) set forth in TABLES I–II. The components used in the thermoplastic resin compositions were as follows:

PC-1 Linear polycarbonate resin derived from bisphenol A, phosgene and having a melt flow index of about 10 grams per minute at 300° C., using a 1.2 kilogram weight;

PC-2 Linear polycarbonate resin derived from bisphenol A, phosgene and having a melt flow index of about 7 grams per minute at 300° C., using a 1.2 kilogram weight;

ABS: Emulsion polymerized acrylonitrile-butadiene-styrene graft copolymer comprising 50 wt % of a discontinuous elastomeric phase (polybutadiene) and 50 wt % of a rigid thermoplastic phase (copolymer of 75 wt % styrene and 25 wt % acrylonitrile);

SAN-1 Copolymer of 75 wt % styrene and 25 wt % acrylonitrile having a weight average molecular weight of about 95,000 g/mol;

SAN-2 Copolymer of 75 wt % styrene and 25 wt % acrylonitrile having a weight average molecular weight of about 62,000 g/mol.

PHOS-1 Bis(2,4-di-tert butyl)pentaerythritol diphosphite (Ultranox 626, GE Specialty Chemicals, Inc.);

PHOS2 2,4-di-tert-(butylphenyl) phosphite (Irgafos 168, Ciba-Geigy)

PHENYL Octadecyl-3-(3,5-di-tert-butyl-4-hydroxyphenyl)propionate (Irganox 1076, Ciba-Geigy);

THIO Pentaerythritol tetrakis(3-(dodecylthio)propionate) (Seenox 412S, Argus Chemical Company);

TSAN: Additive made by copolymerizing styrene and acrylonitrile in the presence of an aqueous dispersion of PTFE (50 wt % PTFE, 50 wt % of a styrene-acrylonitrile copolymer containing 75 wt % styrene and 25 wt % acrylonitrile);

COLOR Mixture of colorants; and

RDP Resorcinol diphosphate (Fyroflex™ RDP, Akzo Chemicals).

Each of the compositions of Examples 1 and 2 and Comparative Examples C1–C4 also contained 0.9 pbw colorants, including a coated $TiO_2$, and 0.5 pbw of a lubricant additive and each of the compositions of Example 3 and 4 and Comparative Example C5 also contained 0.15 pbw of a lubricant additive.

In a series of runs, the components were blended in a Henschel mixer at room temperature for about one minute to form each of the respective compositions of Examples 1–3 and Comparative Examples C1–C5. The compositions were then extruded into strands, chopped into pellets.

The compositions of Examples 1 and 2 and Comparative Examples C1–C4 were compression molded to form specimens (each about 1/16 inch-thick) for color testing. Specimens of each of the compositions of Examples 1–2 and Comparative Examples C1–C4 were heat aged at 210° C. The color change of the specimens with heat aging was monitored according using a MacBeth 20/20 spectrophotometer. The spectrophotometer readings were used as a basis for calculating CIELAB ΔE values for each of the specimens at each of several heat aging residence times. Results are set forth in TABLE I as ΔE values at various heat aging residence times for each of the compositions of Examples 1 and 2 and Comparative Examples C1–C4.

TABLE I

|  | C1 | C2 | C3 | C4 | 1 | 2 |
|---|---|---|---|---|---|---|
| PC | 70.5 | 70.5 | 70.5 | 70.5 | 70.5 | 70.5 |
| ABS | 9 | 9 | 9 | 9 | 9 | 9 |
| SAN | 8.3 | 8.3 | 8.3 | 8.3 | 8.3 | 8.3 |
| RDF | 11.5 | 11.5 | 11.5 | 11.5 | 11.5 | 11.5 |
| TSAN | 0.4 | 0.4 | 0.4 | 0.4 | 0.4 | 0.4 |
| PHOS1 | 0.3 | 0.3 | — | — | 0.3 | 0.15 |
| PHOS2 | — | — | — | 0.3 | — | — |
| PHENYL | 0.3 | — | 0.3 | 0.3 | 0.3 | 0.15 |
| THIO | — | 0.3 | 0.3 | 0.3 | 0.3 | 0.15 |
| ΔE at t |  |  |  |  |  |  |
| t = 0 | 0 | 0 | 0 | 0 | 0 | 0 |
| t = 2 hr | 1.28 | 1.33 | 3.76 | 3.21 | 1.63 | 1.61 |
| t = 3 hr | 2.35 | 2.86 | 4.06 | 13.72 | 1.56 | 5.41 |
| t = 6 hr | 31.13 | 26.47 | 13.83 | 23.80 | 5.68 | 32.28 |
| t = 12 hr | 34.41 | 36.09 | 33.18 | 34.57 | 31.93 | 34.62 |
| t = 24 hr | 40.82 | 40.47 | 40.47 | 43.11 | 35.92 | 42.57 |

The compositions of Examples 1 and 2 exhibited improved stability, as evidenced by the less pronounced increase in ΔE values with heat aging, compared to the compositions of Comparative Examples C1–C4.

The physical properties of the compositions of Examples 3 and 4 and Comparative Example C5 were measured as follows. Melt flow index ("MFI") was measured at 260° C. using a 5 kilogram weight. Dart impact strength was measured according to ASTM D3763 (using 4 inch diameter by 0.125 inch disks at a speed of 22 feet per second). Notched Izod impact strength was measured, using a sample size of 2.5 inch by 0.5 inch by 0.125 inch, according to ASTM D256. Tensile Strength and elongation were measured according to ASTM D638. Heat distortion temperature was measured at 264 pounds per square inch ("psi") on unannealed 0.125 inch thick test specimens according to ASTM D648.

Results of the testing are set forth below for Comparative Example C5 and Example 3 in TABLE II as follows: heat distortion temperature, expressed in degrees Fahrenheit ("HDT, °F") MFI, expressed in grams per minute ("g/min"), notched Izod impact strength at room temperature and at −40° C., expressed in foot-pounds per inch ("ft-lb/in"), dart impact at −30° C. and at −40° C., expressed in foot-pounds ("ft-lb"), noting the percentage of specimens that exhibited a ductile fracture mode ("% ductile"), tensile strength at yield and at break, expressed in kilopounds per square inch ("kpsi"), elongation at break, expressed as a percentage of original sample length ("%") and melt viscosity at 550° F. and a shear rate of 100s$^{-1}$, expressed in Poise.

TABLE II

|  | C5 | 3 | 4 |
|---|---|---|---|
| PC-1 | — | 69 | — |
| PC-2 | 69 | — | 69 |
| ABS | 15 | 18.2 | 15 |
| SAN-2 | 16 | 12.8 | 16 |
| POLYBUTENE | 2 | — | 2 |
| Carbon black | — | 0.5 | — |
| PHOS1 | — | 0.15 | 0.25 |
| PHENYL | — | 0.25 | 0.25 |
| THIO | — | 0.25 | 0.25 |
| Properties |  |  |  |
| Melt Viscosity (Poise) | 3183 | — | 2982 |
| MFI at 260° C. (g/min) | — | 11.8 | — |
| Notched Izod Impact, RT (ft-lb/in) | 13.57 | 12.7 | 13.83 |
| Notched Izod Impact, −40° C. (ft-lb/in) | 8.2 | 10.9 | 10.11 |
| Dart Impact, −30° C. (ft-lb) | 46.67 | 45.3 | 46.31 |
| % ductile | 70 | 100 | 100 |
| Dart Impact, −40° C. (ft-lb) | 48.56 | 46 | 50.14 |
| % ductile | 30 | 90 | 60 |
| Tensile Strength at yield (kpsi) | 8.25 | 7.62 | 8.40 |
| Tensile Strength at break (kpsi) | 9.00 | 8.44 | 9.34 |
| Elongation at break (%) | 203 | 200 | 212 |
| HDT (° F.) | 227 | 228 | 226 |

The composition of Examples 3 and 4 exhibited improved low temperature ductility, compared to the composition of Comparative Example 5.

What is claimed is:

1. A thermoplastic resin composition, comprising:

(a) an aromatic polycarbonate resin (b) a rubber modified graft copolymer, comprising a discontinuous elastomeric phase dispersed in a continuous rigid thermoplastic phase, wherein at least a portion of the rigid thermoplastic phase is chemically grafted to the elastomeric phase, (c) a sterically hindered phenol stabilizer compound according to the structural formula:

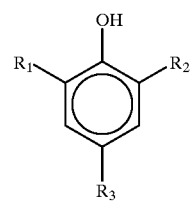

wherein $R_1$ and $R_2$ are each independently $(C_1–C_{12})$ alkyl, and $R_3$ is $(C_1–C_{12})$alkyl, hydroxy$(C_1–C_{12})$alkyl or $(C_1–C_{24})$alkoxycarbonyl$(C_{1-12})$alkyl;

(d) a thioester stabilizer compound according to the structural formula:

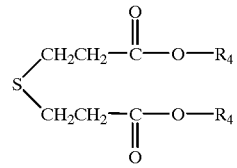

wherein $R_4$ is $(C_1–C_{24})$alkyl, or according to the structural formula:

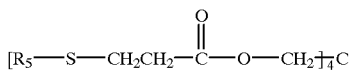

wherein $R_5$ is $(C_1-C_{24})$alkyl, and (e) a phosphite stabilizer compound according to the structural formula:

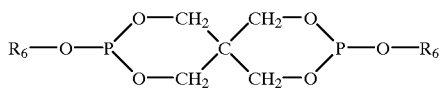

wherein $R_6$ is $(C_1-C_{24})$alkyl or monocyclic aryl, optionally substituted with up to three $(C_1-C_{12})$akyl groups.

2. The composition of claim 1, wherein the composition comprises from 55 to 90 parts by weight of the polycarbonate resin, 3 to 11 parts by weight of the rubber modified graft copolymer, from 0.01 to 1.0 parts by weight of the sterically hindered phenol stabilizer compound, from 0.01 to 1.0 parts by weight of the thioester stabilizer compound and from 0.01 to 1.0 parts by weight phosphite stabilizer compound, each based on 100 parts by weight of the combined amount of the aromatic polycarbonate resin and the rubber modified graft copolymer.

3. The composition of claim 1, wherein the composition further comprises a flame retarding amount of a phosphate flame retardant.

4. The composition of claim 3, wherein, the composition comprises from 55 to 90 parts by weight of the polycarbonate resin, from 3 to 11 parts by weight of the rubber modified graft copolymer, from 2 to 20 parts by weight of the phosphate flame retardant, from 0.01 to 1.0 parts by weight of the sterically hindered phenol stabilizer compound, from 0.01 to 1.0 parts by weight of the thioester stabilizer compound and from 0.01 to 1.0 parts by weight phosphite stabilizer compound, each based on 100 parts by weight of the aromatic polycarbonate resin rubber modified graft copolymer and phosphate flame retardant.

5. The composition of claim 3, further comprising a drip-reducing amount of a fluoropolymer additive.

6. The composition of claim 1, wherein the aromatic polycarbonate resin comprises a linear aromatic polycarbonate resin derived from bisphenol A and phosgene and having a weight average molecular weight of the polycarbonate resin is from about 10,000 to about 200,000 grams per mole.

7. The composition of claim 1, wherein the rubber modified thermoplastic resin comprises an elastomeric phase comprising structural units derived from one or more conjugated diene monomers and a rigid thermoplastic phase comprising structural units derived from one or more monomers selected from vinyl aromatic monomers and monoethylenically unsaturated nitrile monomers.

8. The composition of claim 3, wherein the organophosphorus flame retardant of the present invention comprises one or more compounds according to the structural formula (IX):

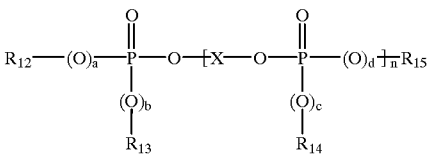

wherein $R_{12}$, $R_{13}$, $R_{14}$ and $R_{15}$ are each independently aryl, which may optionally be substituted with halo or alkyl, X is arylene, optionally substituted with halo or alkyl, a, b, c and d are each independently 0 or 1, and n is an integer of from 0 to 5.

9. The composition of claim 8, wherein the organophosphorus flame retardant comprises a mixture of organophosphorus compounds according to formula (IX), wherein, independently for each organophosphorus compound of the mixture, $R_{12}$, $R_{13}$, $R_{14}$ and $R_{15}$ are each phenyl, a, b, c and d are each 1, X is 1,3-phenylene and n is an integer from 1 to 5 and wherein the blend of oligomers has an average n of from greater than 1 to less than 3.

10. The composition of claim 5, wherein the fluoropolymer additive comprises polytetrafluoroethylene.

11. The composition of claim 1, wherein the phenolic stabilizer comprises octadecyl-3-(3,5-di-tert-butyl-4-hydroxyphenyl)propionate.

12. The composition of claim 1, wherein the thioester stabilizer component comprises pentaerythritol tetrakis(3-(dodecylthio)propionate).

13. The composition of claim 1, wherein the phosphorus containing stabilizer comprises bis(2,4-di-tert butyl) pentaerythritol diphosphite.

14. A shaped article made by molding the composition of claim 1.

15. A themoplastic resin composition, comprising the composition obtained by blending:

(a) an aromatic polycarbonate resin (b) a rubber modified graft copolymer, comprising a discontinuous elastomeric phase dispersed in a continuous rigid thermoplastic phase, wherein at least a portion of the rigid thermoplastic phase is chemically grafted to the elastomeric phase, (c) a sterically hindered phenol stabilizer compound according to the structural formula:

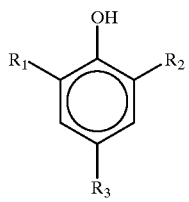

wherein $R_1$ and $R_2$ are each independently $(C_1-C_{12})$ alkyl, and $R_3$ is $(C_1-C_{12})$alkyl, hydroxy$(C_1-C_{12})$alkyl or $(C_1-C_{24})$alkoxycarbonyl$(C_{1-12})$alkyl;

(d) a thioester stabilizer compound according to the structural formula:

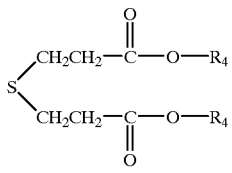
wherein $R_4$ is $(C_1-C_{24})$alkyl, or according to the structural formula:
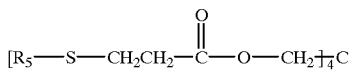
wherein $R_5$ is $(C_1-C_{24})$alkyl, and
(e) a phosphite stabilizer compound according to the structural formula:
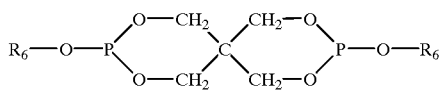
wherein $R_6$ is $(C_1-C_{24})$alkyl or monocyclic aryl, optionally substituted with up to three $(C_1-C_{12})$akyl groups.
* * * * *